United States Patent
Menet

(10) Patent No.: US 9,134,737 B2
(45) Date of Patent: Sep. 15, 2015

(54) THERMOSTATIC MIXING VALVE

(75) Inventor: Georges Menet, Les Marches (FR)

(73) Assignee: Watts Industries France, Fressenneville (FR)

( * ) Notice: Subject to any disclaimer, the term of this patent is extended or adjusted under 35 U.S.C. 154(b) by 865 days.

(21) Appl. No.: 13/202,242

(22) PCT Filed: Feb. 24, 2010

(86) PCT No.: PCT/FR2010/050315
§ 371 (c)(1),
(2), (4) Date: Feb. 28, 2012

(87) PCT Pub. No.: WO2010/097545
PCT Pub. Date: Sep. 2, 2010

(65) Prior Publication Data
US 2012/0145801 A1    Jun. 14, 2012

(30) Foreign Application Priority Data

Feb. 26, 2009   (FR) ...................................... 09 51207

(51) Int. Cl.
G05D 23/185    (2006.01)
G05D 23/13     (2006.01)

(52) U.S. Cl.
CPC ............ G05D 23/134 (2013.01); *G05D 23/132* (2013.01); *G05D 23/1306* (2013.01); *G05D 23/1353* (2013.01); *G05D 23/1386* (2013.01)

(58) Field of Classification Search
CPC ............ G05D 23/1306; G05D 23/132; G05D 23/134; G05D 23/1386
USPC ................................. 236/12.11, 12.16–12.18
See application file for complete search history.

(56) References Cited

U.S. PATENT DOCUMENTS

| | | | |
|---|---|---|---|
| 4,285,465 A * | 8/1981 | North ........................ | 236/12.11 |
| 4,923,115 A * | 5/1990 | Sekoguchi et al. ......... | 236/12.11 |
| 6,575,377 B1 * | 6/2003 | Graves ......................... | 236/12.2 |
| 6,732,937 B2 * | 5/2004 | Graves ......................... | 236/12.2 |
| 6,938,827 B2 * | 9/2005 | Luig et al. ................... | 236/12.12 |
| 7,086,602 B2 * | 8/2006 | Yang ............................ | 236/12.2 |
| 7,163,157 B2 * | 1/2007 | Goncze et al. .............. | 236/12.16 |
| 7,175,100 B2 * | 2/2007 | Eveleigh et al. ............ | 236/12.14 |
| 7,191,954 B2 * | 3/2007 | Kline .......................... | 236/12.2 |

(Continued)

FOREIGN PATENT DOCUMENTS

| | | |
|---|---|---|
| DE | 3740040 A1 | 6/1989 |
| WO | PCT/ISA/210 | 4/2010 |

*Primary Examiner* — M. Alexandra Elve
*Assistant Examiner* — Joel Attey
(74) *Attorney, Agent, or Firm* — Mintz Levin Cohn Ferris Glovsky and Popeo, P.C.; Steven M. Jensen

(57) ABSTRACT

A thermostatic mixing valve includes a mixing slide arranged between two seats for mixing fluids at different temperatures and capable of flowing between the mixing slide and the two seats, respectively, so as to supply a mixed fluid; and an axial thermal actuator arranged between the mixing slide and an absorption member sensitive to the temperature of the mixed fluid for creating a controlled movement of the position of the mixing slide between the two seats in order to supply the mixed fluid at a controlled temperature, where the absorption member includes one of the seats and is capable of moving in a direction that increases the distance between the seats when the mixing slide is bearing on the other seat so as to absorb an excess of axial movement of a rod of the absorption member due to excessive variation of the mixed fluid temperature.

6 Claims, 4 Drawing Sheets

(56) References Cited

U.S. PATENT DOCUMENTS

| | | | |
|---|---|---|---|
| 7,198,059 B2* | 4/2007 | Kempf et al. | 137/337 |
| 2001/0007336 A1* | 7/2001 | Jelloul et al. | 236/12.11 |
| 2004/0046037 A1* | 3/2004 | Swadling | 236/12.11 |
| 2004/0238650 A1* | 12/2004 | Luig et al. | 236/12.11 |
| 2005/0139688 A1* | 6/2005 | Yang | 236/12.11 |
| 2006/0243813 A1* | 11/2006 | Beck | 236/12.11 |
| 2007/0194137 A1* | 8/2007 | Goncze | 236/12.11 |
| 2007/0221740 A1* | 9/2007 | Beck et al. | 236/12.11 |
| 2008/0191043 A1* | 8/2008 | Goncze | 236/12.11 |
| 2008/0257969 A1* | 10/2008 | Nember | 236/93 A |

\* cited by examiner

THERMOSTATIC MIXING VALVE

This application is the U.S. national phase, pursuant to 35 U.S.C. §371, of PCT international application Ser. No. PCT/FR2010/050315, filed Feb. 24, 2010, designating the United States and published in French on Sep. 2, 2010 as publication WO 2010/097545 A1, which claims priority to French Application Ser. No. 0951207, filed Feb. 26, 2009. The entire contents of the aforementioned patent applications are incorporated herein by this reference.

BACKGROUND OF THE INVENTION (1) Field of the Invention

The present invention relates to the field of thermostatic valves for mixing fluids at different temperatures in order to obtain a fluid at a controlled temperature.

(2) Description of the Related Art

Such valves can be used in particular in the field of domestic sanitary installations in order to supply domestic water at a controlled temperature and in the field of the regulation of heating water in all sorts of applications.

Known thermostatic mixing valves comprise a mixing slide that slides between two fixed seats, the hot water and the cold water being supplied through spaces between the mixing slide and each of these two fixed seats. The slide is actuated by a thermal actuator containing a product, the volume of which varies with temperature and the variation in volume of which controls the position of the slide between the two fixed seats.

SUMMARY OF THE INVENTION

The aim of the present invention is to improve such thermostatic valves.

There is provided a thermostatic mixing valve which may comprise a mixing means that is able to move between two seats in order to mix fluids at different temperatures that are able to pass between the mixing means and each of these two seats in order to supply a mixed fluid; and an actuating means fitted between the mixing means and an absorption member, said actuating means being sensitive to the temperature of the mixed fluid in order to produce a travel regulating the position of the mixing means between the two seats so as to supply a mixed fluid at a regulated temperature.

Said absorption member may have one of said seats and may be able to be moved in the direction of the increasing distance between the two seats when the mixing means is bearing against the other seat, so as to absorb an excess travel of the actuating means under the effect of an excess in variation in the temperature of the mixed fluid.

There is provided a thermostatic mixing valve which may comprise a casing having an axial internal space in which there are arranged an annular seat and a shoulder, which are spaced apart axially from one another and are oriented in the same axial direction, a first lateral communicating passage between a first inlet for the inlet of a hot fluid and the internal space, a second lateral communicating passage between a second inlet for the inlet of a cold fluid and the internal space and a third communicating passage between the internal space and an outlet located downstream of the seat of the casing for the outlet of a mixed fluid that results from the mixing; an absorption member which is mounted such that it can slide axially in said internal space and is urged toward said shoulder by a first spring; a mixing slide which is mounted such that it can slide axially in said internal space between the seat of the casing and the absorption member and is urged toward said absorption member by a second spring, this slide having an axial passage, said first lateral communicating passage being able to be closed off by the sliding mixing slide when the latter engages with the seat of the casing and said second lateral communicating passage being able to be closed off by the sliding mixing slide when the latter engages with a seat of said absorption member; and an axial thermal actuator comprising a body containing a product, the volume of which varies with temperature, and an axial rod, the position of which with respect to the body varies depending on the volume of the product, the body of the actuator being secured to the slide and positioned at least partially in the third communicating passage, and the rod of the actuator being able to come axially into contact with said absorption member.

The absorption member may comprise a plate that is able to bear against said shoulder and has said seat and a hub that can be regulated axially with respect to the plate, the rod of the thermal actuator being able to come into contact with this axial hub.

The sliding mixing slide may comprise an external part mounted such that it can slide in an annular part of the casing separating the first and second communicating passages and a central part connected to this external part and on which the body of the thermal actuator is mounted.

A spacer may be mounted on the body of the thermal actuator, the second spring being inserted between this spacer and a part of the casing.

BRIEF DESCRIPTION OF THE DRAWINGS

A thermostatic mixing valve will now be described in a nonlimiting manner with reference to the drawing, in which.

DETAILED DESCRIPTION OF THE INVENTION

Figure 1:
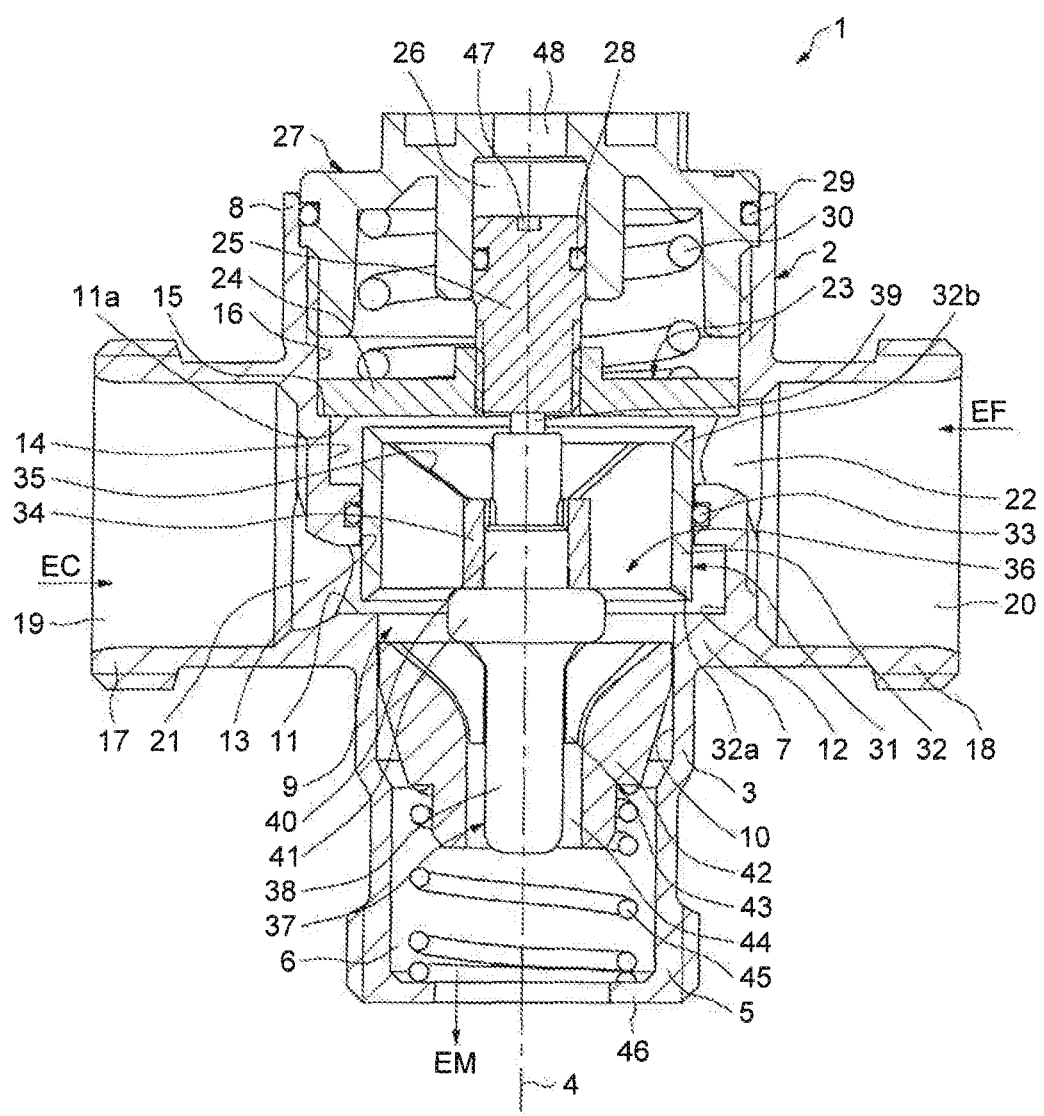
FIG. 1 shows a longitudinal section through a thermostatic mixing valve in a position for mixing hot water and cold water.

The thermostatic mixing valve 1 shown in the figures comprises a casing 2 which comprises a longitudinal tubular part 3 established along an axis 4.

This longitudinal tubular part 3 has an end piece 5 forming an outlet 6, to which there may be connected an outlet duct, a central part 7 and an end piece 8 opposite the end piece 5.

Formed in the central part 7 is an internal space 9, in which there are formed, in succession starting from the outlet 6, a cylindrical communicating passage 10, an annular shoulder constituting an annular seat (hereinafter referred to as "annular seat" or "seat" 11), an annular groove 12, one side of which prolongs the annular seat 11, a cylindrical portion 13, a cylindrical part 14, an annular shoulder 15 and a cylindrical portion 16. Thus, the annular seat 11 and the annular shoulder 15 are oriented in the same axial direction.

The diameter of the cylindrical portion 13 is smaller than the diameter of the cylindrical passage 10. The diameter at the bottom of the annular groove 12 and that of the cylindrical part 14 are larger than the diameter of the cylindrical portion 13. The diameter of the cylindrical portion 16 is larger than the diameter of the cylindrical part 14.

The casing 2 furthermore comprises opposite lateral branches 17 and 18, forming a first inlet 19 and a second inlet 20. The first inlet 19 communicates with the internal space 9 of the tubular part 3 through a passage 21 which opens into the groove 12. The second inlet 20 communicates with the internal space 9 of the casing 2 through a passage 22 which opens into the cylindrical part 14.

The mixing valve 1 also comprises an axially sliding absorption member 23, which comprises a plate 24 positioned radially in the cylindrical part 16 of the tubular part 3 and a cylindrical axial hub 25, one end of which is screwed into the central part of the radial plate 24 and the other end of which is inserted such that it can slide in a cylindrical axial part 26 of an end cap 27 screwed into the end piece 8.

An annular seal 28 is inserted between the axial hub 25 and the axial part 26 of the end cap 27. An annular seal 29 is inserted between the end cap 27 and the end piece 8.

A helical spring 30 is inserted between the plate 24 of the absorption member 23 and the end cap 27, this spring 30 urging the absorption member 23 in the direction which moves the plate 24 axially closer to and brings it into abutment against the shoulder 15.

The mixing valve 1 also comprises a mixing means consisting of a mixing slide 31 which comprises an external cylindrical tubular part 32 which is mounted such that it can slide in the cylindrical portion 13 of the internal space 9 of the casing 2, with an annular seal 33 being inserted in between. This external tubular part 32 is able to move axially between the seat 11 of the casing 2 and the plate 24 of the absorption member 23 and has an annular end 32a that is able to come into sealing contact with the seat 11 and an annular end 32b that is able to come into sealing contact with an annular region of the plate 24 that forms a seat 11a, facing the spring 30.

The mixing slide 31 further comprises an internal cylindrical tubular part 34 connected to the external tubular part 32 via radial arms 35, such that the mixing slide 31 has an axial passage 36 between these tubular parts 32 and 34.

The mixing valve 1 also comprises an actuating means consisting of an axial thermal actuator 37, which comprises an axial body 38 containing a product, the volume of which varies with temperature, and an axial rod 39 which passes through a front part 40 of the body 38 and the axial position of which with respect to the body 38 varies depending on the volume of the product. This product may be based on wax.

The front part 40 of the body 38 is mounted in the internal tubular part 34 of the mixing slide 31 and a protruding annular part 41 of this body 38 is in abutment against one end of this internal tubular part 34, such that the body 38 extends largely downstream of the seat 11 in the internal space 9 of the casing 2, on the outlet 6 side, and such that the rod 39 is able to move axially against the hub 25 of the absorption member 23, on the same side as the end 32b of the mixing slide 31.

An annular spacer 42 is mounted around and at a distance from the body 38 of the thermal actuator 37 and has internal wings 43 in contact with the body 38 and in axial abutment against the protruding annular part 41 of this body 38, such that there is an axial passage 44 between the body 38 of the actuator 37 and the annular spacer 42. The peripheral surface of the annular spacer 42 can be adjusted such that it can slide and be guided in the cylindrical part 10 of the casing 2.

A helical spring 45 is inserted between the annular spacer 42 and an internal shoulder 46 of the end piece 5, such that this spring 45 acts axially on the movable assembly formed by the mixing slide 31, the body 38 of the thermal actuator 37 and the spacer 42 in the direction which spaces the end 32a of the external tubular part 32 of the mixing slide 31 apart from the seat 11.

The thermostatic mixing valve 1 can function in the following manner.

The inlet 19 in the casing 2 is connected to a source of hot water EC and the inlet 20 in the casing 2 is connected to a source of cold water EF.

Mixed or warm water EM, which is produced by controlled mixing of the inlet hot water and the inlet cold water, exits through the outlet 6.

This outlet mixed water EM can be at a temperature between a low temperature threshold Sb and a high temperature threshold Sh, the values of which depend on the thermal characteristics of the thermal actuator 37, producing the axial movement of the rod of the actuator 39 with respect to its body 38, on the axial adjustment of the hub 25 of the absorption member 23 with respect to the axial rod 39 of the thermal actuator 37, and on the travel of the external tubular part 32 of the mixing slide 31 between the seat 11 and the seat 11a on the plate 24 of the absorption member 23.

As is shown in FIG. 1, the hot water EC is mixed with the cold water EF in the following manner.

When the temperature of the outlet mixed water EM is between the low threshold Sb and the high threshold Sh, the annular ends 32a and 32b of the external part 32 of the mixing slide 31 are each spaced apart from the annular seat 11 on the casing 2 and from the seat 11a on the plate 24 of the absorption member 23, the plate 24 being in abutment against the shoulder 14 under the effect of the spring 30, whereas the rod 39 of the thermal actuator is in abutment against the hub 25 of the absorption member 23 under the effect of the spring 45.

Hot water EC passes through the communicating passage 21 and toward the inside between the annular end 32a and the annular seat 11. At the same time, cold water EF passes through the communicating passage 22, towards the inside between the annular end 32b and the plate 24 and through the axial passage 36 in the mixing slide 31. The flow of hot water EC and the flow of cold water EF meet approximately at the annular seat 11 and are mixed so as to obtain a flow of mixed water EM, which passes axially around the body 38 of the thermal actuator 37 in the direction of the outlet 6. The volume of the product enclosed in the thermal actuator 37, which determines the axial position of the rod 39 with respect to the body 38 of the thermal actuator 37, which determines the position of the mixing slide 31, enables the above functional situation.

When the temperature of the mixed water EM drops toward the low threshold Sb, the volume of the product enclosed in the thermal actuator 37 decreases, the rod 39 moves into the body 38 of the thermal actuator 37 and the mixing slide 31 moves away from the annular seat 11 and toward the plate 24. The inlet for hot water EC increases in size and the inlet for cold water EF decreases in size.

When the temperature of the mixed water EM climbs toward the high threshold Sh, the volume of the product enclosed in the thermal actuator 37 increases, the rod 39 leaves the body 38 of the thermal actuator 37 and the mixing slide 31 moves toward the annular seat 11 and away from the plate 24. The inlet for hot water EC decreases in size and the inlet for cold water EF increases in size. A situation in which the temperature of the outlet mixed water EM is regulated between the low threshold Sb and the high threshold Sh is thus produced.

Figure 2:
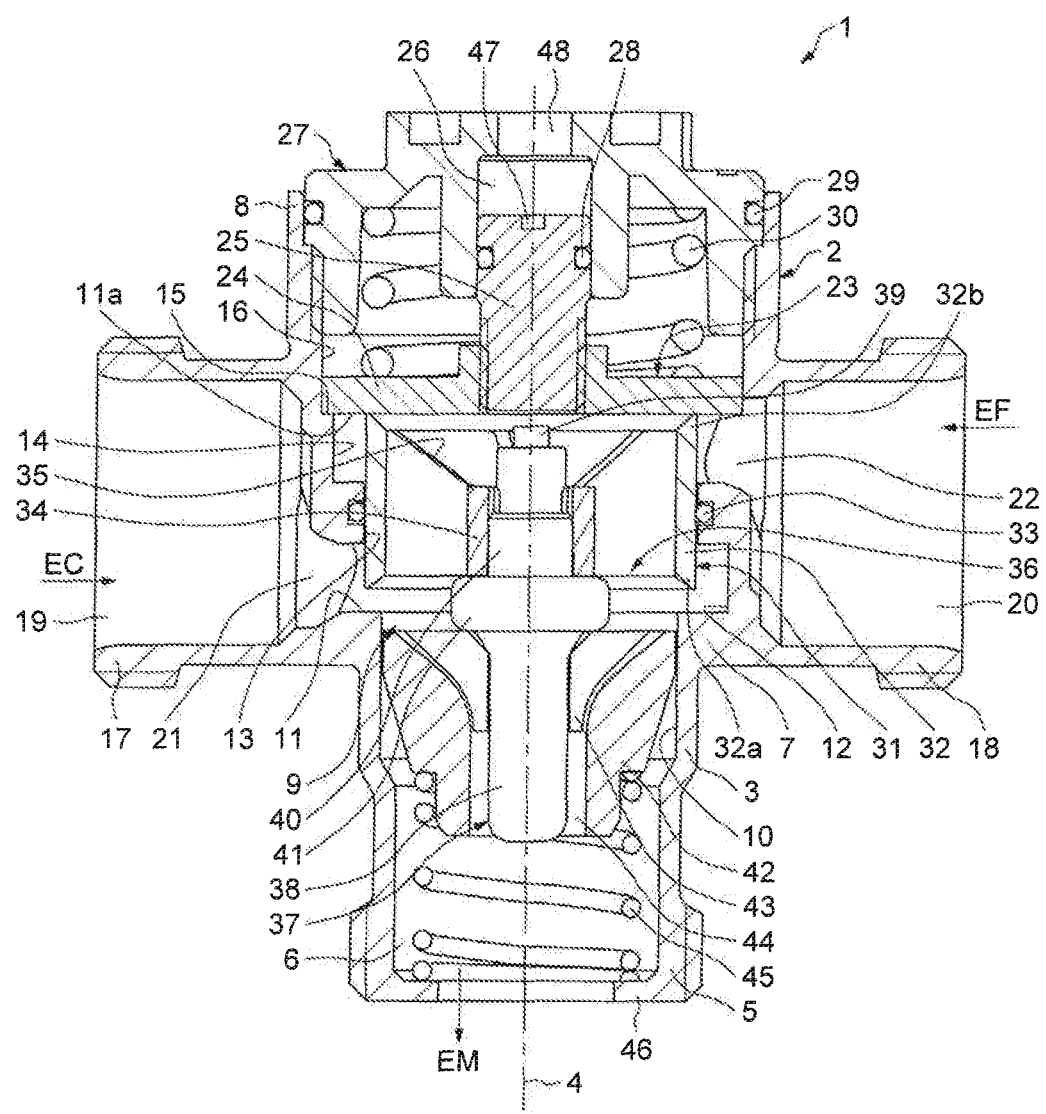
FIG. 2 shows a longitudinal section through the thermostatic mixing valve from FIG. 1 in a position of closure of the cold water inlet.

As is shown in FIG. 2, when the temperature reaches the low threshold Sb, the reduction in volume of the product enclosed in the thermal actuator 37 causes the end 32b of the external part 32 of the mixing slide 31 to reach the plate 24 of the absorption member 23 and the external part 32 of the mixing slide 31 to close the inlet for cold water EF.

When the temperature drops below the low threshold Sb, this situation is maintained and the rod 39 of the thermal actuator 37 moves away from the hub 25 on account of the reduction in volume of the product contained in the thermal actuator 37 which is caused by the excessive reduction in the temperature of the mixed water. The loading of the springs 30 and 45 with respect to one another is adapted to produce this situation. In fact, the axial force of the spring 30 is greater than the axial force of the spring 45. As a result, the inlet of cold water EF is cut and only the inlet of hot water EC takes place, thereby causing the temperature of the product contained in the thermal actuator 37 to rise again and the product to increase in volume in order to bring about opposite movements and to reestablish the regulating situation described with reference to FIG. 1.

Figure 3:
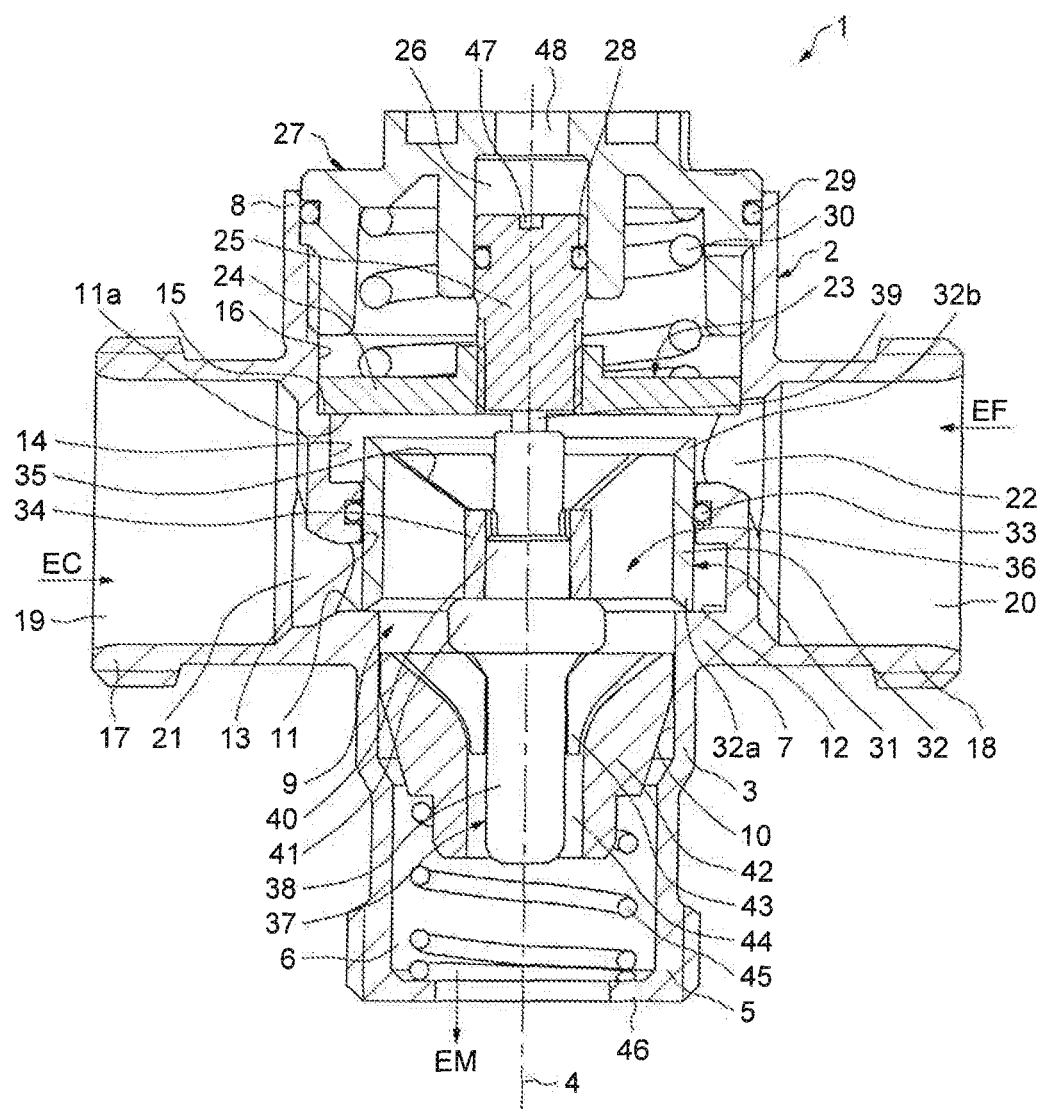
FIG. 3 shows a longitudinal section through the thermostatic mixing valve from FIG. 1 in a position of closure of the hot water inlet.

As is shown in FIG. 3, when the temperature reaches the high threshold Sh, the increase in volume of the product enclosed in the thermal actuator 37 causes the end 32a of the external part 32 of the mixing slide 31 to reach the annular seat 11 and the external part 32 of the mixing slide 31 to close the inlet passage 21 for hot water EC.

When the temperature exceeds the high threshold Sh, this situation is maintained. Since the volume of the product enclosed in the thermal actuator 37 continues the increase under the effect of an excessive increase in the temperature of the mixed water EM, the rod 39 of the thermal actuator 37 bearing against the hub 25 causes the absorption member 23 to move counter to the spring 30 by moving the plate 24 away from the shoulder 15, thereby increasing the distance between the seat 11a on the plate 24 and the seat 11 on the casing 2.

Figure 4:
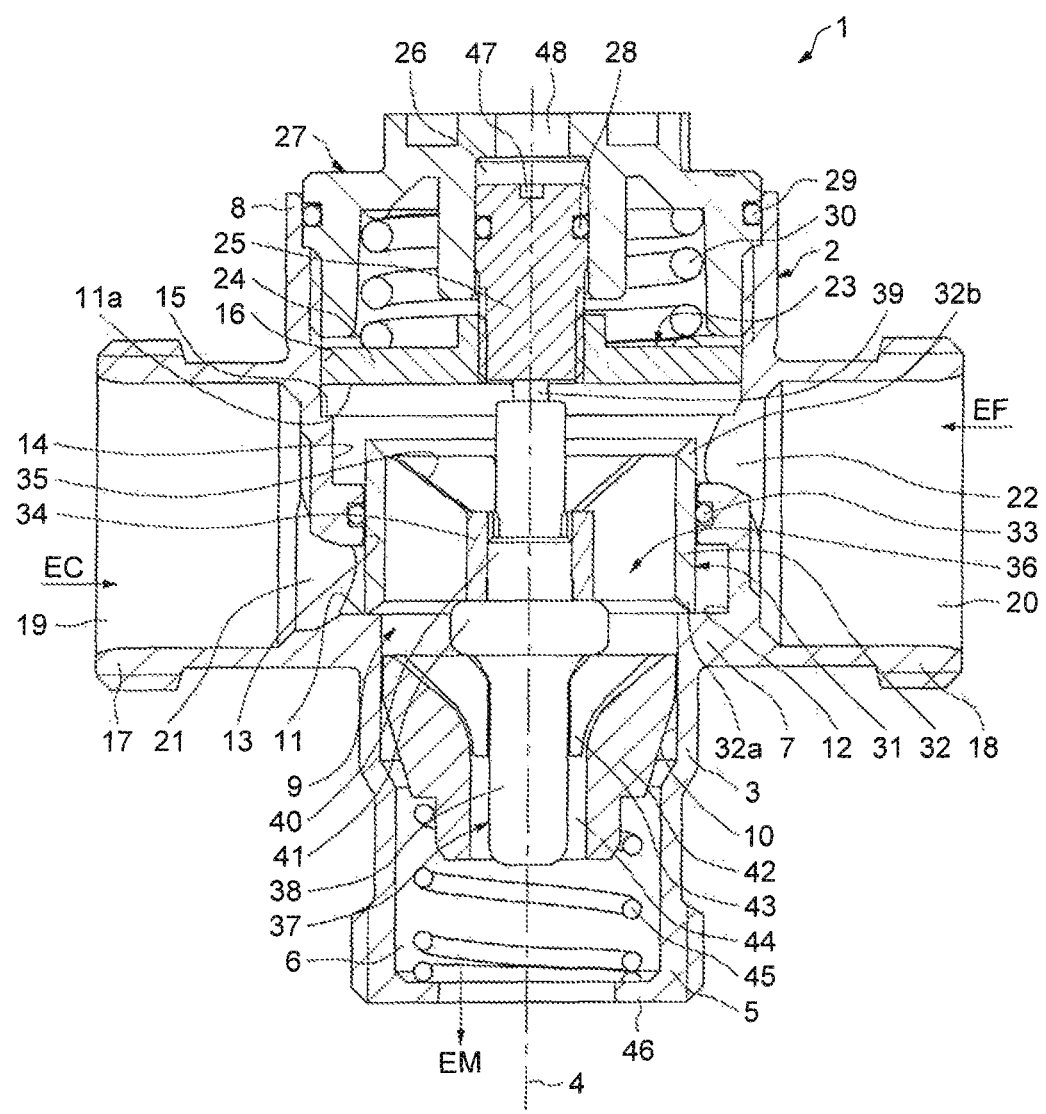
FIG. 4 shows a longitudinal section through the thermostatic mixing valve from FIG. 1 in a position of closure of the hot water inlet and of excess travel.

As is shown in FIG. 4, the result of the above situation is that the inlet of hot water EC is cut and only the inlet of cold water EF takes place, thereby causing the temperature of the product contained in the thermal actuator 37 to fall and the product to decrease in volume in order to bring about opposite movements and to reestablish the regulating situation described with reference to FIG. 1.

The temperature thresholds Sh and Sb for the functioning of the valve 1 can be adjusted by adjusting the axial position of the cylindrical axial hub 25 with respect to the radial plate 24, by screwing or unscrewing the hub by virtue of a screwdriver which can be brought into engagement with a slot 47 formed in the end of the hub 25, this slot 47 being accessible through an axial passage 48 in the end cap 27.

The invention claimed is:

1. A thermostatic mixing valve comprising:
   a casing having:
      an axial internal space in which there are arranged a first annular seat and an annular shoulder, which are spaced apart axially from one another and are oriented in the same axial direction, and a cylindrical portion located between the first annular seat and the annular shoulder;
      a first lateral communicating passage between a first inlet for a first fluid and the internal space, between the first annular seat and the axial annular guiding portion;
      a second lateral communicating passage between a second inlet for a second fluid and the internal space, between the axial annular guiding portion and the annular shoulder; and
      a third communicating passage between the internal space and an outlet located downstream of the first annular seat of the casing for a mixed fluid that results from a mixing;
   an absorption member which is mounted such that it can slide axially in said internal space and which is urged toward said annular shoulder by a first spring in order to come into sealing contact under the annular shoulder, the absorption member having a second annular seat facing the first annular seat of the casing;
   a mixing slide which is mounted such that it can slide axially in said internal space through the axial annular guiding portion of the casing, between the first annular seat of the casing and the second annular seat of the absorption member, the mixing slide being urged toward said absorption member by a second spring, the mixing slide having an axial passage, said first lateral communicating passage being able to be closed off by the mixing slide when the mixing slide engages with the first annular seat of the casing and said second lateral communicating passage being able to be closed off by the mixing slide when the mixing slide engages with the second annular seat of said absorption member; and
   an axial thermal actuator comprising a body containing a product, the volume of which varies with temperature, and an axial rod, the position of which with respect to the body varies depending on the volume of the product, the body of the actuator being secured to the mixing slide and positioned at least partially in the third communicating passage, and the rod of the actuator being able to come axially into contact with said absorption member for spacing apart the absorption member from the annular shoulder against the first spring when the mixing slide engages the first annular seat in order to absorb an excess of axial movement of the rod relative to the body of the axial thermal actuator.

2. The valve as claimed in claim 1, in which said absorption member comprises a plate that is able to bear against said shoulder and has said seat, and a hub that can be regulated axially with respect to the plate, the rod of the thermal actuator being able to come into contact with this axial hub.

3. The valve as claimed in claim 1, in which the mixing slide comprises an external part mounted such that it can slide in an annular part of the casing separating the first and second communicating passages and a central part connected to this external part and on which the body of the thermal actuator is mounted.

4. The valve as claimed in claim 1, further comprising a spacer mounted on the body of the thermal actuator, the second spring being inserted between this spacer and a part of the casing.

5. The valve as claimed claim 2, in which the mixing slide comprises an external part mounted such that it can slide in an annular part of the casing separating the first and second communicating passages and a central part connected to this external part and on which the body of the thermal actuator is mounted.

6. The valve as claimed in claim 3, further comprising a spacer mounted on the body of the thermal actuator, the second spring being inserted between this spacer and a part of the casing.

* * * * *